United States Patent
Yen

(10) Patent No.: US 9,526,085 B2
(45) Date of Patent: Dec. 20, 2016

(54) APPARATUSES FOR COMMUNICATING WITH NEW CARRIER TYPE PHYSICAL BROADCAST CHANNEL

(71) Applicant: Industrial Technology Research Institute, Hsinchu County (TW)

(72) Inventor: Chia-Pang Yen, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 311 days.

(21) Appl. No.: 14/243,279

(22) Filed: Apr. 2, 2014

(65) Prior Publication Data
US 2014/0293913 A1     Oct. 2, 2014

Related U.S. Application Data

(60) Provisional application No. 61/807,335, filed on Apr. 2, 2013.

(51) Int. Cl.
H04W 72/00      (2009.01)
H04L 5/00       (2006.01)

(52) U.S. Cl.
CPC .......... *H04W 72/005* (2013.01); *H04L 5/0053* (2013.01); *H04L 5/0073* (2013.01)

(58) Field of Classification Search
CPC ..... H04W 72/05; H04W 72/02; H04W 72/042
See application file for complete search history.

(56) References Cited

U.S. PATENT DOCUMENTS

| 7,826,859 | B2 | 11/2010 | Lee et al. | |
|---|---|---|---|---|
| 2010/0227569 | A1 | 9/2010 | Bala et al. | |
| 2013/0077582 | A1* | 3/2013 | Kim | H04W 74/006 370/329 |
| 2015/0237602 | A1* | 8/2015 | Chae | H04B 7/08 370/329 |
| 2015/0341908 | A1* | 11/2015 | Wang | H04W 72/02 370/312 |

OTHER PUBLICATIONS

Nokia, Nokia Siemens Networks, Time/Frequency Tracking Performance on New Carrier Type, 3GPP Draft, R1-121266, Jeju, Korea, Mar. 26-30, 2012.
Qualcomm Incorporated, Wideband RRM Measurements, 3GPP Draft, R4-120463, Dresden 6-11, 2012, Dresden Germany.

* cited by examiner

*Primary Examiner* — Un C Cho
*Assistant Examiner* — Fangyan Deng
(74) *Attorney, Agent, or Firm* — Winston Hsu; Scott Margo

(57) ABSTRACT

A communication station includes a modulation circuit, a mapping circuit and a transmitting circuit. The modulation circuit is configured to operably modulate the master information block (MIB). The mapping circuit is configured to operably map the modulated MIBs to the new carrier type physical broadcast channel (PBCH). The PBCH is configured in a plurality of radio frames. The transmitting circuit is configured to operably transmit the radio frames. Moreover, the mapping circuit maps the modulated MIBs to only part of six central radio blocks of the predetermined subframes of the radio frames. The six central radio blocks are configured to locate around the DC subcarrier.

18 Claims, 6 Drawing Sheets

FIG. 5

| | Slot L0 | | | | | | | Slot L1 | | | | | | |
|---|---|---|---|---|---|---|---|---|---|---|---|---|---|---|
| | S0 | S1 | S2 | S3 | S4 | S5 | S6 | S7 | S8 | S9 | S10 | S11 | S12 | S13 |
| SC(6N+11) | | | DMRS | DMRS | | SSS | PSS | | | DMRS | DMRS | | | |
| SC(6N+10) | | | DMRS | DMRS | | SSS | PSS | | | DMRS | DMRS | | | |
| SC(6N+9) | | | | | CRS | SSS | PSS | | | | | CRS | | |
| SC(6N+8) | | | | | | SSS | PSS | | | | | | | |
| SC(6N+7) | | | | | | SSS | PSS | | | | | | | |
| SC(6N+6) | CRS | | DMRS | DMRS | | SSS | PSS | CRS | | DMRS | DMRS | | | |
| SC(6N+5) | | | DMRS | DMRS | | SSS | PSS | | | DMRS | DMRS | | | |
| SC(6N+4) | | | | | | SSS | PSS | | | | | | | |
| SC(6N+3) | | | | | CRS | SSS | PSS | | | | | CRS | | |
| SC(6N+2) | | | DMRS | DMRS | | SSS | PSS | | | DMRS | DMRS | | | |
| SC(6N+1) | | | DMRS | DMRS | | SSS | PSS | | | DMRS | DMRS | | | |
| SC(6N) | CRS | | | | | SSS | PSS | CRS | | | | | | |

APPARATUSES FOR COMMUNICATING WITH NEW CARRIER TYPE PHYSICAL BROADCAST CHANNEL

CROSS-REFERENCE TO RELATED APPLICATIONS

This application claims the benefit of priority to U.S. Provisional Application Ser. No. 61/807,335, filed on Apr. 2, 2013; the entirety of which is incorporated herein by reference for all purposes.

BACKGROUND

The disclosure generally relates to a communication system and, more particularly, to the communication system capable of performing communications with the new carrier type physical broadcast channel.

In the $3^{rd}$ Generation Partnership Project-Long Term Evolution (3GPP-LTE) specification, the new carrier type (NCT) technique may be utilized to reduce the usage of cell-specific reference signals. The interference brought by the cell-specific reference signals may be reduced so that the accompanied advantages of energy conservation and enhanced data transmission amount may improve the performance of the communication system.

In the 3GPP system, the communication station may transmit the master information blocks (MIBs) to the communication devices by utilizing the physical broadcast channel (PBCH). The MIBs may comprise the information of the bandwidth of the downlink channel, the number of the system frames, the number of antennas, etc. The communication devices, however, require the cell-specific reference signals to successful demodulate the PBCH signals. When the PBCH signals are transmitted by utilizing the NCT technique, the communication devices may not demodulate the PBCH signals by utilizing the cell-specific reference signals so that the shared bandwidth of the broadcast channel and the transmission mode of the physical downlink shared channel of the subframes are confined.

In the conventional radio frame structure for PBCH signal transmission, the communication system utilizing the NCT technique may result in the degradation of the communication performance and even abnormal operations.

SUMMARY

In view of the foregoing, it may be appreciated that a substantial need exists for methods and apparatuses that mitigate or reduce the problems above.

An example embodiment of communication station is disclosed, comprising: a modulation circuit, configured to operably modulate one or more master information blocks (MIBs); a mapping circuit, configured to operably map the modulated MIBs to a new carrier type physical broadcast channel (PBCH) wherein the PBCH is configured in a plurality of radio frames; and a transmitting circuit, configured to operably transmit the radio frames; wherein each of the radio frames comprises a plurality of subframes; each of the subframes comprises a plurality of slots; each of the slots comprises a plurality of orthogonal frequency division multiplexing (OFDM) symbols; each of the OFDM symbols comprises a plurality of subcarriers; each of the slots comprises a plurality of radio blocks (RBs); each of the RBs comprises a predetermined number of OFDM symbols located on a predetermined number of subcarriers; the mapping circuit maps the modulated MIBs to a plurality of central RBs of a first predetermined subframes of the radio frames; the central RBs are configured to be around a DC subcarrier of the subcarriers; and the mapping circuit maps the modulated MIBs to only part of the central RBs.

Another example embodiment of a communication station is disclosed, comprising: a modulation circuit, configured to operably modulate one or more master information blocks (MIBs); a mapping circuit, configured to operably map the modulated MIBs to a new carrier type physical broadcast channel (PBCH) wherein the PBCH is configured in a plurality of radio frames; and a transmitting circuit, configured to operably transmit the radio frames; wherein each of the radio frames comprises a plurality of subframes; each of the subframes comprises a plurality of slots; each of the slots comprises a plurality of orthogonal frequency division multiplexing (OFDM) symbols; each of the OFDM symbols comprises a plurality of subcarriers; each of the slots comprises a plurality of radio blocks (RBs); each of the RBs comprises a predetermined number of OFDM symbols located on a predetermined number of subcarriers; the mapping circuit maps the modulated MIBs to a plurality of central RBs of a first predetermined OFDM symbol of a first predetermined subframes of the radio frames, to a plurality of central RBs of a second predetermined OFDM symbol of the first predetermined subframes of the radio frames, to a plurality of central RBs of a third predetermined OFDM symbol of a second predetermined subframes of the radio frames and to a plurality of central RBs of a fourth predetermined OFDM symbol of the second predetermined subframes of the radio frames; the central RBs are configured to be around a DC subcarrier of the subcarriers; and the first predetermined OFDM symbol, the second predetermined OFDM symbol, the third predetermined OFDM symbol and the fourth predetermined OFDM symbol are respectively configured to be adjacent to a primary synchronization signal and a secondary synchronization signal.

Another example embodiment of a communication device is disclosed, comprising: a receiving circuit, configured to operably receive a plurality of radio frames transmitted by a first communication station; a demapping circuit, configured to operably demap one or more modulated master information blocks (MIBs) transmitted by the first communication station in a new carrier type physical broadcast channel (PBCH); and a demodulation circuit, configured to operably demodulate the one or more MIBs; wherein each of the radio frames comprises a plurality of subframes; each of the subframes comprises a plurality of slots; each of the slots comprises a plurality of orthogonal frequency division multiplexing (OFDM) symbols; each of the OFDM symbols comprises a plurality of subcarriers; each of the slots comprises a plurality of radio blocks (RBs); each of the RBs comprises a predetermined number of OFDM symbols located on a predetermined number of subcarriers; the demapping circuit demaps the modulated MIBs from a plurality of central RBs of a first predetermined subframes of the radio frames; the central RBs are configured to be around a DC subcarrier of the subcarriers; and the demapping circuit demaps the modulated MIBs only from part of the central RBs.

Another example embodiment of a communication device is disclosed, comprising: a receiving circuit, configured to operably receive a plurality of radio frames transmitted by a first communication station; a demapping circuit, configured to operably demap one or more modulated master information blocks (MIBs) transmitted by the first communication station in a new carrier type physical broadcast channel (PBCH); and a demodulation circuit, configured to operably demodulate the one or more MIBs; wherein each of the radio frames comprises a plurality of subframes; each of the subframes comprises a plurality of slots; each of the slots comprises a plurality of orthogonal frequency division multiplexing (OFDM) symbols; each of the OFDM symbols comprises a plurality of subcarriers; each of the slots comprises a plurality of radio blocks (RBs); each of the RBs comprises a predetermined number of OFDM symbols located on a predetermined number of subcarriers; the demapping circuit demaps the modulated MIBs from a plurality of central RBs of a first predetermined OFDM symbol of a first predetermined subframes of the radio frames, to a plurality of central RBs of a second predetermined OFDM symbol of the first predetermined subframes of the radio frames, to a plurality of central RBs of a third predetermined OFDM symbol of a second predetermined subframes of the radio frames and to a plurality of central RBs of a fourth predetermined OFDM symbol of the second predetermined subframes of the radio frames; the central RBs are configured to be around a DC subcarrier of the subcarriers; and the first predetermined OFDM symbol, the second predetermined OFDM symbol, the third predetermined OFDM symbol and the fourth predetermined OFDM symbol are respectively configured to be adjacent to a primary synchronization signal and a secondary synchronization signal.

Both the foregoing general description and the following detailed description are examples and explanatory only, and are not restrictive of the invention as claimed.

BRIEF DESCRIPTION OF THE DRAWINGS

FIG. 5 shows a simplified schematic diagram of another radio block in FIG. 2 according to one embodiment of the present disclosure.

FIG. 6 shows a simplified schematic diagram of the physical broadcast channel signals mapped in the radio frames according to one embodiment of the present disclosure.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
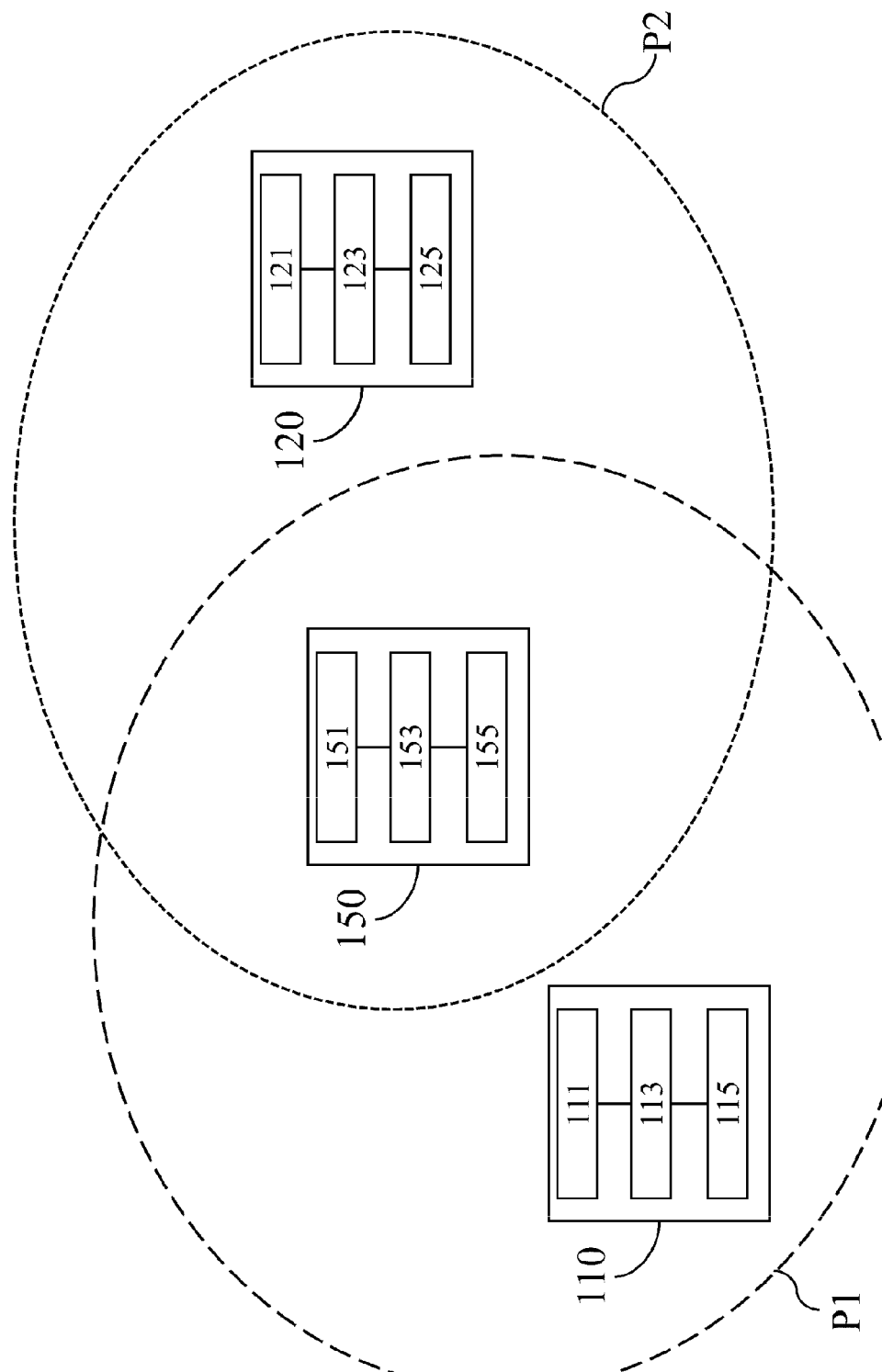
FIG. 1 shows a simplified functional block diagram of communication system according to one embodiment of the present disclosure.

FIG. 1 shows a simplified functional block diagram of a communication system 100 according to one embodiment of the present disclosure. In the embodiment in FIG. 1, the communication system 100 is a $3^{rd}$ Generation Partnership Project-Long Term Evolution (3GPP-LTE) compatible system and capable of performing communications by utilizing the new carrier type (NCT) technique. The communication system 100 comprises communication stations 110 and 120 and a communication device 150. For the purposes of conciseness and clear explanation, other components and connections of the communication system 100 are not shown in FIG. 1.

In the embodiments below, part of the area in which the communication station 110 performs communications overlaps part of the area in which the communication station 120 performs communications. As shown in FIG. 1, part of the communication area P1 of the communication station 110 overlaps part of the communication area P2 of the communication station 120.

The communication station 110 comprises a modulation circuit 111, a mapping circuit 113 and a transmitting circuit 115. The communication station 120 comprises a modulation circuit 121, a mapping circuit 123 and a transmitting circuit 125.

The modulation circuits 111 and 121 respectively modulate data, control signals, system information, etc. for generating modulated signals.

The mapping circuits 113 and 123 respectively map the modulated signals to radio frames for further processing.

The transmitting circuits 115 and 125 respectively comprise one or more of antennas, analog signal processing circuits, digital signal processing circuits, etc. for transmitting radio frames to communication devices.

The modulation circuits 111 and 121, the mapping circuits 113 and 123 and the transmitting circuits 115 and 125 may be respectively realized with microprocessors, network processors, analog signal processing circuits, digital signal processing circuits and/or other suitable circuit elements.

The communication stations 110 and 120 may be respectively realized with the node B, the evolved node B or other suitable base stations.

When the communication stations 110 and 120 transmit the physical broadcast channel (PBCH) signals, the modulation circuits 111 and 121 respectively modulate the master information block (MIB) and other information to be transmitted in the PBCH. For example, the modulation circuits 111 and 121 may respectively perform the insertion of cyclic redundancy check (CRC) code, the channel coding, the scrambling, the QPSK modulation, etc. for generating modulated MIBs. The mapping circuits 113 and 123 may respectively map the modulated MIBs to radio frames according the rate matching rules. The transmitting circuits 115 and 125 may respectively transmit the radio frames to communication devices. The mapping of the modulated MIBs to the radio frames are further explained below.

The communication device 150 comprises a receiving circuit 151, a demapping circuit 153 and a demodulation circuit 155.

The receiving circuit 151 comprises one or more of antennas, analog signal processing circuits, digital signal processing circuits, etc. for receiving radio frames from one or more communication stations.

The demapping circuit 153 demaps the modulated signals (e.g., modulated data, control signals and system information) from the received radio frames for further processing.

The demodulation circuit 155 performs demodulation operations on the modulated signals demapped by the demapping circuit 153.

The receiving circuits 151, the demapping circuits 153 and the demodulation circuit 155 may be respectively realized with microprocessors, network processors, analog signal processing circuits, digital signal processing circuits and/or other suitable circuit elements.

The communication station 150 may be realized with the mobile phone, the tablet computer or other suitable portable user equipments.

When the communication device 150 receives the PBCH signals, the receiving circuit 151 receives the radio frames transmitted by the communication station 110 and/or the communication station 120. The demapping circuit 153 demaps the modulated MIBs from the received radio frames. The demodulation circuit 155 performs demodulation operations on the modulated MIBs demapped by the demapping circuit 153 for generating unmodulated MIBs. For example, the demodulation circuit 155 may perform the descrambling, the channel decoding, the removing of the CRC code, etc. for generating the unmodulated MIBs.

Figure 2:
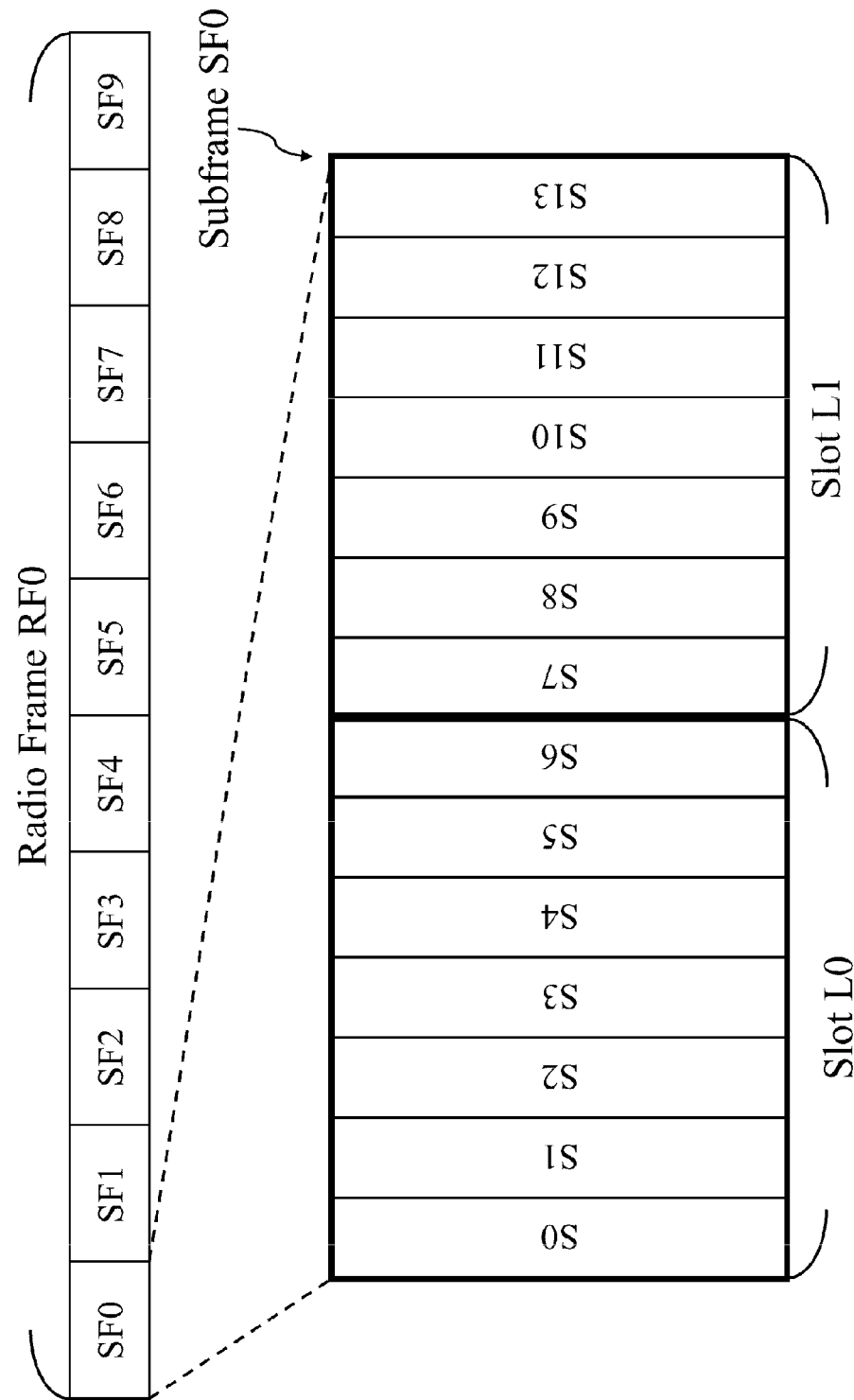
FIG. 2 shows a simplified schematic diagram of a radio frame utilized in the communication system in FIG. 1 according to one embodiment of the present disclosure.

FIG. 2 shows a simplified schematic diagram of a radio frame utilized in the communication system 100 in FIG. 1 according to one embodiment of the present disclosure.

In the embodiment in FIG. 2, a radio frame RF0 comprises ten subframes SF0-SF9. Each of the subframes SF0-SF9 comprises two slots, e.g., the subframe SF0 in FIG. 2 comprises the slots L0 and L1. Each of the slots comprises seven orthogonal frequency division multiplexing (OFDM) symbols, e.g., the slots L0 and L1 respectively comprise OFDM symbols S0-S6 and OFDM symbols S7-S13. Each of the OFDM symbols comprises M subcarriers and the number M of the subcarriers is related to the channel bandwidth utilized by the communication system 100. For example, when the channel bandwidths are respectively configured to be 5 MHz, 10 MHz and 20 MHz, the number of the subcarriers are respectively configured to be 300, 600 and 1200.

Figure 3:
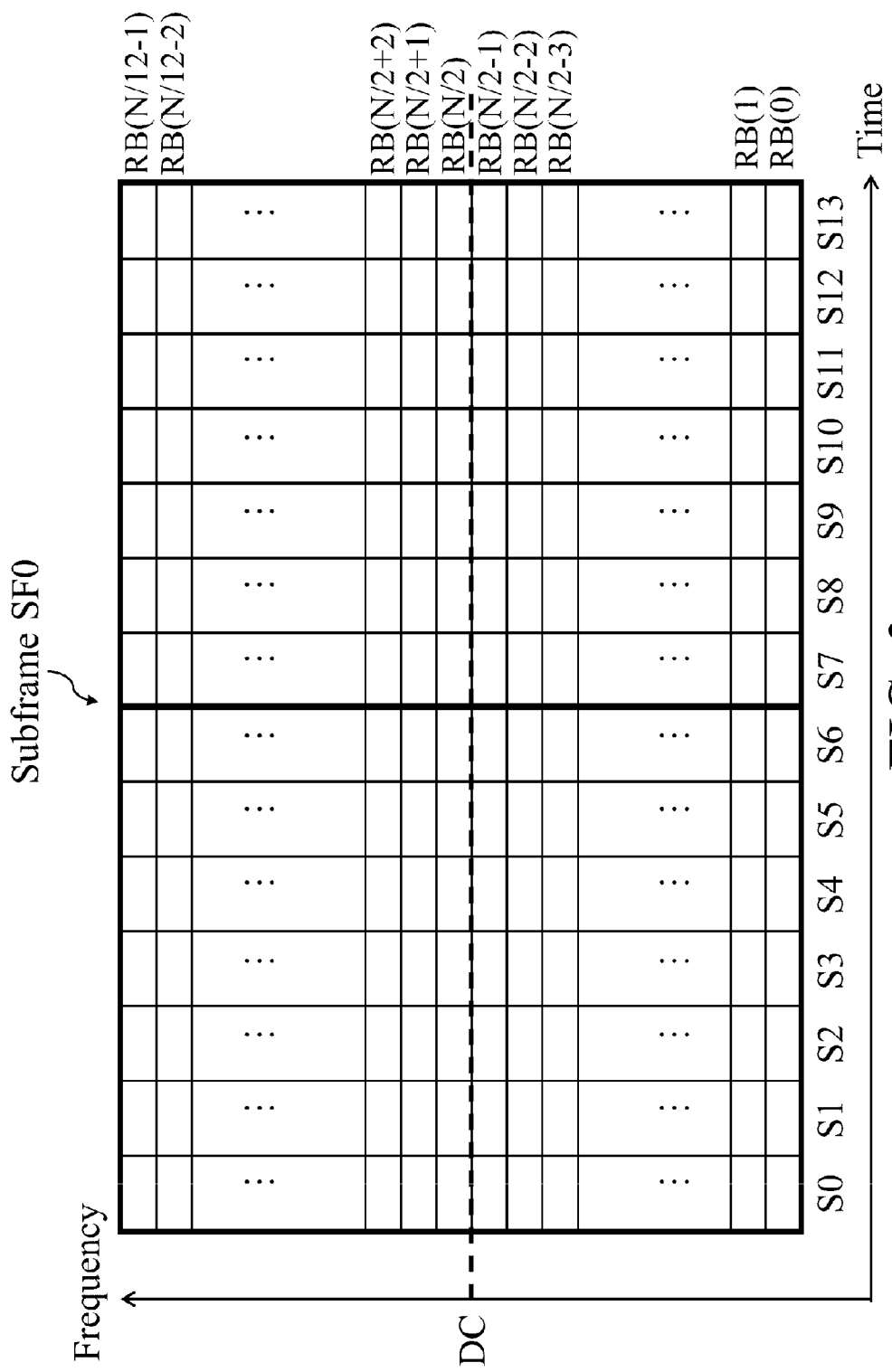
FIG. 3 shows a simplified schematic diagram of the subframe in FIG. 2 according to one embodiment of the present disclosure.

FIG. 3 shows a simplified schematic diagram of the subframe SF0 in FIG. 2 according to one embodiment of the present disclosure. In the embodiment in FIG. 3 each of the slots comprises N radio blocks (RBs) which are respectively numbered by RB(0)-RB(N−1). Moreover, six central radio blocks RB(N/2−3)-RB(N/2+2) locate around the DC subcarrier in each subframes are configured to transmit the PBCH signals. In the slots, the RBs are configured to comprise a predetermined number of OFDM symbols located on a predetermined number of subcarriers.

Figure 4:
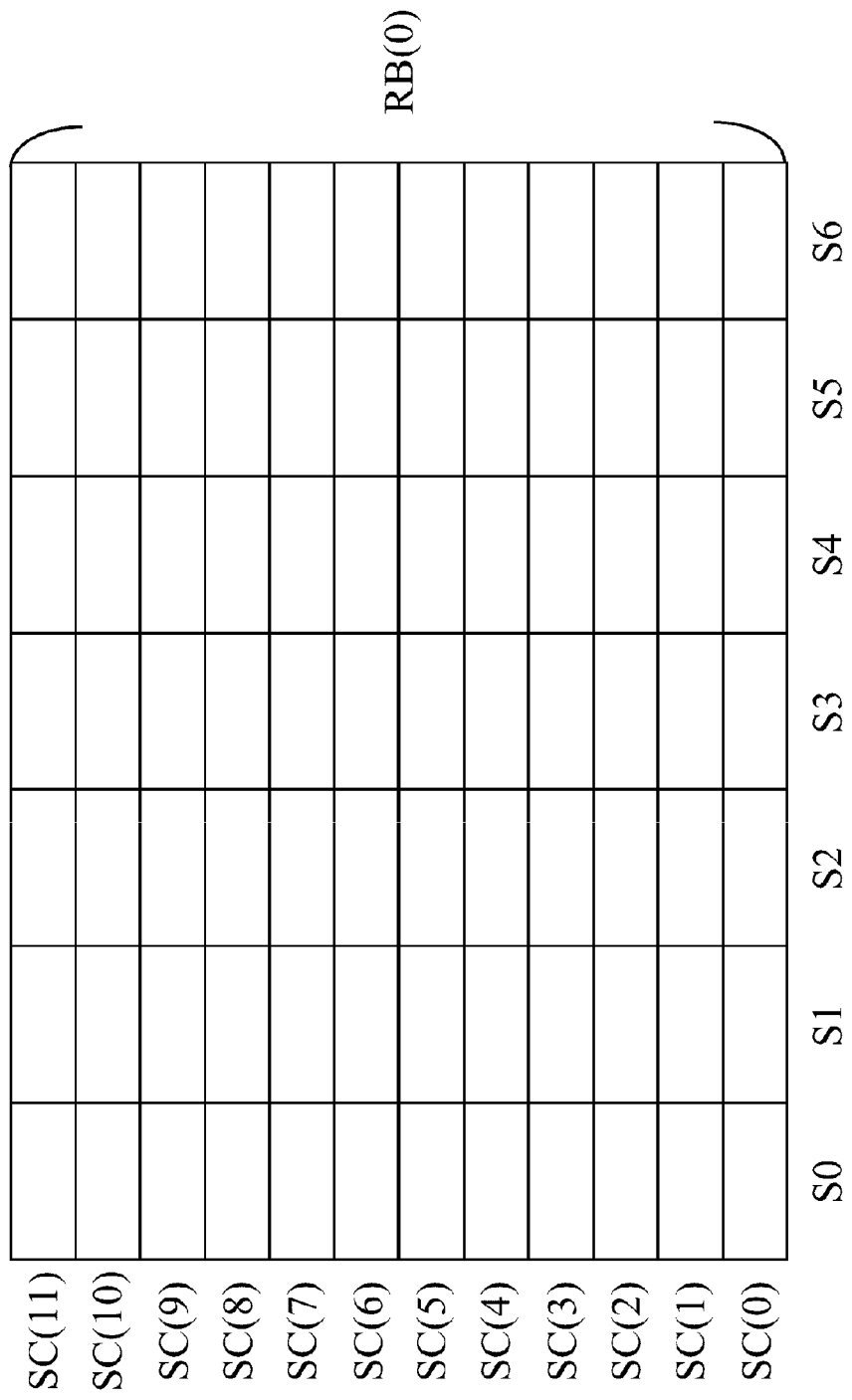
FIG. 4 shows a simplified schematic diagram of one radio block in FIG. 2 according to one embodiment of the present disclosure.

FIG. 4 shows a simplified schematic diagram of the radio block RB(0) in FIG. 2 according to one embodiment of the present disclosure. In the embodiment in FIG. 4, each of the RBs is configured to comprise seven OFDM symbols located on twelve subcarriers. For example, the radio block RB(0) comprises seven OFDM symbols S0-S6 located on the twelve subcarriers SC(0)-SC(11). Therefore, in the embodiment in FIG. 4, when the channel bandwidths are respectively configured to be 5 MHz, 10 MHz and 20 MHz, the number of the subcarriers are respectively configured to be 300, 600 band 1200 and each of the subframes respectively 25, 50 and 100 RBs.

Moreover, a subcarrier of an OFDM symbol is referred to as a resource element (RE). In the embodiment in FIG. 4, each of the RBs comprises 84 REs.

In the conventional communication systems, the PBCH signals are transmitted in part of REs respectively in the six central RBs. In the embodiment utilizing the normal cyclic prefix, each radio flame requires about 240 REs for transmitting the PBCH signals.

In the embodiments below, all usable REs in part of the RBs of the six central RBs are utilized to transmitting the PBCH signals. Therefore, except the REs utilized to transmit the demodulation reference signal, the cell-specific reference signal, the primary synchronization signal and the secondary synchronization signal, only about four RBs may be enough for carrying the 240 REs to transmit the PBCH signal in a subframe.

FIG. 5 shows a simplified schematic diagram of the radio block RB(N/2) in FIG. 2 according to one embodiment of the present disclosure. In the embodiment in FIG. 4, the radio blocks RB(N/2) in the slots L0 and L1 of the subframe SF0 collectively comprise 168 REs. Except 24 REs for carrying the demodulation reference signal (denoted as DMRS in FIG. 5), 8 REs for carrying the cell-specific reference signal (denoted as CRS in FIG. 5), 12 REs for carrying the primary synchronization signal (denoted as PSS in FIG. 5) and 12 REs for carrying the secondary synchronization signal (denoted as SSS in FIG. 5), the radio block RB(N/2) of the subframe SF0 still comprises 112 REs (denoted as blank units in FIG. 5) for transmitting PBCH signals.

Moreover, the mapping circuit may map the PBCH signals to the usable REs with suitable rules according to different design considerations. For example, in one embodiment, the mapping circuit may map the PBCH signals to all usable REs of the subcarriers SC(6N)-SC(6N+13) of the OFDM symbol S0, and then sequentially map to all usable REs of the subcarriers of the OFDM symbols S1-S13. In another embodiment, the mapping circuit may map the PBCH signals to all usable REs of the OFDM symbols S0-S13 of the subcarrier SC(6N), and then sequentially map to all usable REs of the OFDM symbols S1-S13 of the subcarriers SC(6N+1)-SC(6N+13). In another embodiment, the mapping circuit may map the PBCH signal to the usable REs in the radio block according to other suitable rules.

Figure 6:
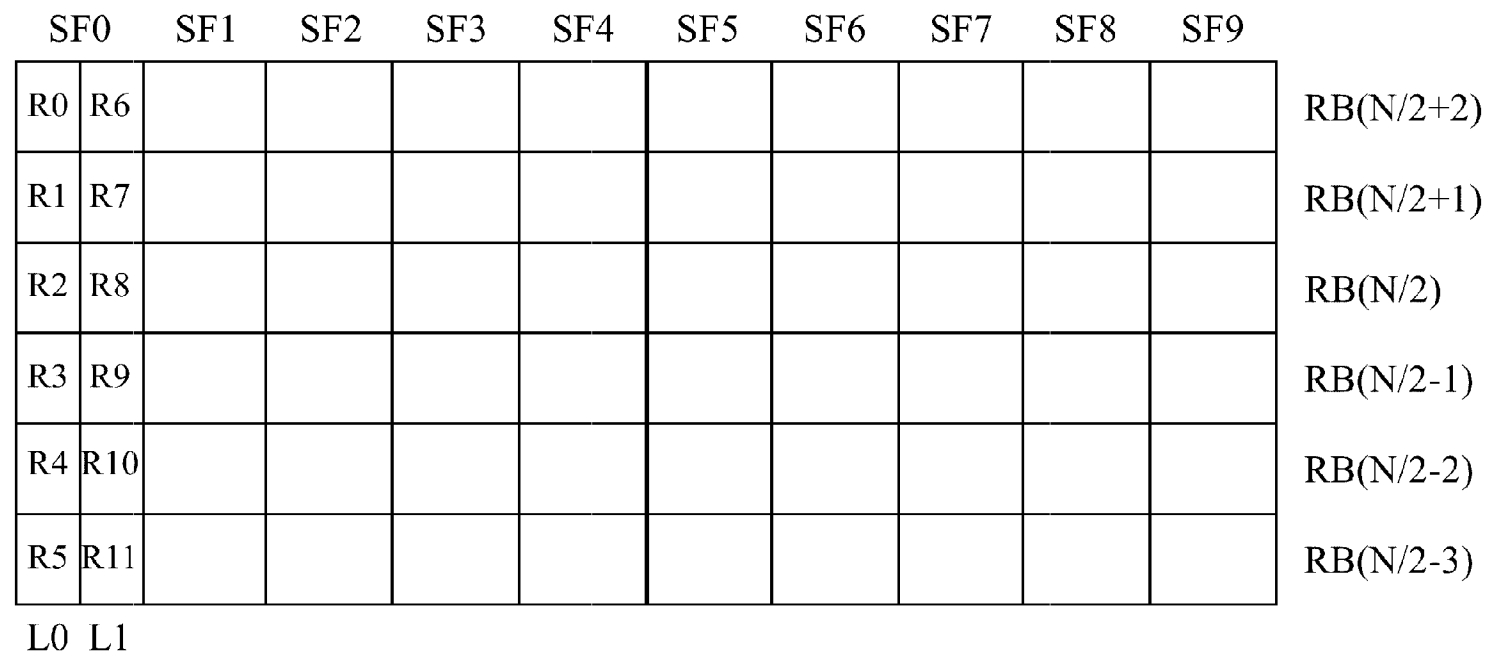

FIG. 6 shows a simplified schematic diagram of the PBCH signals mapped in the radio frames according to one embodiment of the present disclosure. For the purpose of conciseness and clear explanation, only six central RBs of a subframe of a radio frame are shown in the embodiment in FIG. 6.

According to the embodiment in FIG. 5, the REs of four RBs are enough for transmitting the PBCH signals. In the embodiment in FIG. 6, the mapping circuit 113 of the communication station 110 maps modulated MIBs to the six central radio blocks R0-R11 of the predetermined subframe (s) f each radio frames and more specifically maps the modulated MIBs to par of the radio blocks of the six central radio blocks. For example, in the frequency division duplex system, the predetermined subframes are configured to be at least one of the first subframe and the sixth subframe of the radio frames (e.g., the subframes SF0 and SF5). In the time division duplex system, the predetermined subframes are configured to be at least one of the second subframe and the seventh subframe of the radio frames (e.g., the subframes SF1 and SF6).

In one embodiment, the mapping circuit 113 maps the modulated MIBs to a first RB and a second RB of the six central RBs of the first slot L0 of the predetermined subframe SF0 (the first subframe SF0 is utilized as an example below for conciseness only) and to a third RB and a fourth RB of the six central RBs of the second slot L1 of the predetermined subframe SF0. The first RB and the third RB are configured to comprise the same first RB number. The second RB and the fourth RB are configured to comprise the same second RB number.

For example, the mapping circuit 113 maps to the modulated MIBs to the radio blocks R0 and R5 of the first slot L0 and the radio blocks R6 and R11 of the second slot L1 of the predetermined subframe SF0. In this embodiment, the mapping circuit 113 maps the modulated MIBs to the radio blocks R0 and R6 which comprise the same RB number RB(N/2+2) and to the radio blocks R5 and R1 which comprise the same RB number RB(N/2−3). Because the radio blocks R0 and R6 are respectively separated to the radio blocks R5 and R11 by four RBs, the accompanied advantage of the frequency diversity may achieve a better communication performance. In other embodiments, the mapping circuit 113 may map the modulated MIBs to other RBs of the six central RBs of the first slot L0 and the second slot L1 of the predetermined subframe, and the distance between the mapped RBs may be respectively configured to be one, two, three or four radio block(s).

In another embodiment, the mapping circuit 113 maps the modulated MIBs to the first RB and the second RB of the six central RBs of the first slot L0 of the first subframe SF0 and to the third RB and the fourth RB of the six central RBs of the second slot L1 of the first subframe SF0. Moreover, the first RB and the third RB are configured to respectively comprise the first RB number and the third RB number which are different. The second RB and the fourth RB are configured to respectively comprise the second RB number and the fourth RB number which are different.

For example, the mapping circuit 113 maps to the modulated MIBs to the radio blocks R0 and R4 of the first slot L0 and the radio blocks R7 and R11 of the second slot L1 of the predetermined subframe SF0. In this embodiment, the mapping circuit 113 maps the modulated MIBs to the radio block R0 with the RB number RB(N/2+2), the radio block R7 with the RB number RB(N/2+1), the radio blocks R4 with the RB number RB(N/2−2) and the radio block R11 with the RB number RB(N/2+3). Because the radio blocks R0, R7, R4 and R11 are configured on different subcarriers, the accompanied advantage of the time-frequency diversity may achieve a better communication performance.

To avoid the interference between the PBCH signals of the communication station 110 and the PBCH signals of the communication station 120, the communication stations 110 and 120 may be configured to avoid transmitting the PBCH signals by utilizing the RBs with the same RB number.

In another embodiment, the nearby communication station 120 transmits the PBCH signals by utilizing the radio blocks R1, R7, R4 and R10 respectively with the RB number RB(N/2+1) and the RB number RB(N/2−2). The mapping circuit 113 maps the modulated MIBs to the radio blocks R0, R6, R3 and R9 respectively with the RB number RB(N/2+2) and the RB number RB(N/2−1). Therefore, the radio blocks utilized by the communication station 110 and the radio blocks utilized by the communication station 120 comprise different RB number and the interference between the PBCH signals of the communication station 110 and the PBCH signals of the communication station 120 may be reduced.

In another embodiment, the nearby communication station 120 transmits the PBCH signals by utilizing the radio blocks R2, R5, R6 and R9 respectively with the RB number RB(N/2), the RB number RB(N/2−3), the RB number RB(N/2+2) and the RB number RB(N/2−1). The mapping circuit 113 maps the modulated MIBs to the radio blocks R1, R4, R8 and R11 respectively with the RB number RB(N/2+1), the RB number RB(N/2−2), the RB number RB(N/2) and the RB number RB(N/2−3). Therefore, the RB number of each of the radio blocks utilized by the communication station 110 is different from the RB numbers of at least three of the radio blocks utilized by the communication station 120 and the interference between the PBCH signals of the communication station 110 and the PBCH signals of the communication station 120 may be reduced.

Moreover, to effectively reduce the detection time of the PBCH signals, the mapping circuit 113 may map the modulated MIBs to more radio blocks in the six central RB in the predetermined subframe. For example, the mapping circuit 113 may map the modulated MIBs to four RBs in the six central RBs of the predetermined subframe. Moreover, the mapping circuit 113 may map the modulated MIBs to the RBs of the six central RBs of different subframes in different orders. Therefore, compared with the above embodiment, the detection time of the PBCH signals may be reduced from four radio frames to two radio frames.

In another embodiment, in the first radio frame, the mapping circuit 113 of the communication station 110 maps the modulated MIBs sequentially to the first RB, the second RB, the fifth RB and the sixth RB of the six central RBs of the first slot L0 of the first subframe SF0, and sequentially to the third RB, the fourth RB, the seventh RB and the eighth RB of the six central RBs of the second slot L1 of the first subframe SF0. The first RB, the second RB, the fifth RB and the sixth RB are configured to respectively comprise the same RB number with the third RB, the fourth RB, the seventh RB and the eighth RB, which are respectively the first RB number, the second RB number, the third RB number and the fourth RB number.

Moreover, in the second radio frame, the mapping circuit 113 of the communication station 110 maps the modulated MIBs sequentially to the second RB, the fifth RB, the sixth RB and the first RB of the six central RBs of the first slot L0 of the first subframe SF0, and to the fourth RB, the seventh RB, the eighth RB and the third RB of the six central RBs of the second slot L1 of the first subframe SF0. The first RB, the second RB, the fifth RB and the sixth RB are configured to respectively comprise the same RB number with the third RB, the fourth RB, the seventh RB and the eighth RB, which are respectively the first RB number, the second RB number, the third RB number and the fourth RB number. The order of mapping the modulated MIBs to the RBs may be suitably configured according to the embodiment above or other suitable roles according to different design considerations. Therefore, the mapping circuit 113 may map the modulated MIBs to more RBs for effectively reducing the detection time of the PBCH signals.

Moreover, the communication stations 110 and 120 may configured the OFDM symbols of the PBCH sequences specified in the 3GPP-LTE Rel-8 specification to adjacent to the primary synchronization signal and the secondary synchronization signal so that the communication device 150 may perform the demodulation operations with the aid of the primary synchronization signal and the secondary synchronization signal.

For example, in a frequency division duplex system, the primary synchronization signals and the secondary synchronization signals are respectively configured in the sixth OFDM symbol (e.g., the OFDM symbol S5 in FIG. 3) and the seventh OFDM symbol (e.g., the OFDM symbol S6 in FIG. 3) of the first subframe (e.g., the subframe SF0 in FIG. 6) and in the sixth OFDM symbol (e.g., the OFDM symbol S5 in FIG. 3) and the seventh OFDM symbol (e.g., the OFDM symbol S6 in FIG. 3) of the sixth subframe (e.g., the subframe SF5 in FIG. 6). Therefore, four OFDM symbols for carrying the PBCH signal specified in the 3GPP-LTE Rel-8 specification may be configured to locate in the first subframe and the sixth subframe of the radio frames, e.g., the fifth OFDM symbol (e.g., the OFDM symbol S4 in FIG. 3) and the eighth OFDM symbol (e.g., the OFDM symbol S7 in FIG. 3) of the first subframe (e.g., the subframe SF0 in FIG. 6) and the fifth OFDM symbol (e.g., the OFDM symbol S4 in FIG. 3) and the eighth OFDM symbol (e.g., the OFDM symbol S7 in FIG. 3) of the sixth subframe (e.g., the subframe SF5 in FIG. 6).

In a time division duplex system, the primary synchronization signals are configured in the third OFDM symbols of the second subframe and the seventh subframe and the secondary synchronization signals are configured in the fourteenth OFDM symbols of the first subframe and the sixth subframe. Therefore, four OFDM symbols for carrying the PBCH signal specified in the 3GPP-LTE Rel-8 specification may be configured to locate in the second subframe and the seven subframe of the radio frames, e.g., the first OFDM symbol (e.g., the OFDM symbol S0 in FIG. 3) and the second OFDM symbol (e.g., the OFDM symbol S1 in FIG. 3) of the second subframe (e.g., the subframe SF1 in FIG. 6) and the first OFDM symbol (e.g., the OFDM symbol S0 in FIG. 3) and the second OFDM symbol (e.g., the OFDM symbol S1 in FIG. 3) of the seventh subframe (e.g., the subframe SF6 in FIG. 6).

In the above embodiments, compared with conventional PBCH signals transmitted across all sixth central RBs, only part of the radio blocks of the six central RBs are required for transmitting the PBCH signals. Therefore, other radio blocks not utilized for transmitting PBCH signal may be utilized for effectively transmitting data and the spectral efficiency may be improved.

In the above embodiments, only part of radio blocks of the six central RBs are utilized for transmitting PBCH signals. Therefore, the PBCH signals may be transmitted in a suitable rule that possesses the advantage of the frequency diversity or the advantage of the time-frequency diversity according to different design considerations. Because only part of radio blocks of the six central RBs are utilized for transmitting PBCH signals, the PBCH collision between the communication stations may be reduced and the embodiments are very suitable to be utilized in the heterogeneous network.

In the above embodiments, the detection time of the PBCH signals may be reduced by flexibly transmitting the PBCH signals in part of radio blocks of the six central RBs.

In the above embodiments, the six central radio blocks are utilized as examples for conciseness. In other embodiments, the communication system 100 may utilize other number of central RBs (e.g., four central RBs and eight central RBs) for performing PBCH signal transmission.

In the above embodiments, compared with conventional PBCH signal transmissions, the same amount of information of PBCH signals may be transmitted without affecting the communication performance of the communication system.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A communication station, comprising:
a modulation circuit, configured to operably modulate one or more master information blocks (MIBs);
a mapping circuit, configured to operably map the modulated MIBs to a new carrier type physical broadcast channel (PBCH) wherein the PBCH is configured in a plurality of radio frames; and
a transmitting circuit, configured to operably transmit the radio frames;
wherein each of the radio frames comprises a plurality of subframes; each of the subframes comprises a plurality of slots; each of the slots comprises a plurality of orthogonal frequency division multiplexing (OFDM) symbols; each of the OFDM symbols comprises a plurality of subcarriers; each of the slots comprises a plurality of radio blocks (RBs); each of the RBs comprises a predetermined number of OFDM symbols located on a predetermined number of subcarriers; the mapping circuit maps the modulated MIBs to a plurality of central RBs of a first predetermined subframes of the radio frames; the central RBs are configured to be around a DC subcarrier of the subcarriers; and the mapping circuit maps the modulated MIBs to only part of the central RBs;
wherein the mapping circuit maps the modulated MIBs to a first RB and a second RB of the central RBs of a first slot of the first predetermined subframe and to a third RB and a fourth RB of the central RBs of a second slot of the second predetermined subframe, the first RB and the third RB respectively comprise a first RB number and a third RB number which are different and the second RB and the fourth RB respectively comprise a second RB number and a fourth RB number which are different.

2. The communication station of claim 1, wherein the mapping circuit maps the modulated MIBs to a first RB and a second RB of the central RBs of a first slot of the first predetermined subframe and to a third RB and a fourth RB of the central RBs of a second slot of the first predetermined subframe; the first RB and the third RB comprise a same first RB number; and the second RB and the fourth RB comprise a same second RB number.

3. The communication station of claim 2, wherein the first RB and the second RB are separated by (N−2) RBs among the N central RBs of the first slot; and the third RB and the fourth RB are separated by (N−2) RBs among the N central RBs of the second slot.

4. The communication station of claim 2, wherein when a nearby communication station transmits PBCH signals by utilizing a plurality of RBs with a third RB number and a plurality of RBs with a fourth RB number, the mapping circuit maps the modulated MIBs to the first RB, the second RB, the third RB and the fourth RB; the first RB number is different from the third RB number and the fourth number; and the second RB number is different from the third RB number and the fourth RB number.

5. The communication station of claim 2, wherein the mapping circuit maps the modulated MIBs to a fifth RB and a sixth RB of the central RBs of a first slot of the first predetermined subframe and to a seventh RB and an eighth RB of the central RBs of a second slot of the first predetermined subframe; the fifth RB and the seventh RB comprise a same third RB number; and the sixth RB and the eighth RB comprise a same fourth RB number.

6. The communication station of claim 2, wherein when a nearby communication station transmits PBCH signals by utilizing a plurality of RBs with a fifth RB number, a plurality of RBs with a sixth RB number, a plurality of RBs with a seventh RB number and a plurality of RBs with an eighth RB number, the mapping circuit maps the modulated MIBs to the first RB, the second RB, the third RB and the fourth RB; and each of the first RB number, the second RB number, the third RB number and the fourth RB number is different from at least three of the fifth RB number, the sixth RB number, and the seventh RB number and the eighth RB number.

7. A communication station, comprising:
a modulation circuit, configured to operably modulate one or more master information blocks (MIBs);
a mapping circuit, configured to operably map the modulated MIBs to a new carrier type physical broadcast channel (PBCH) wherein the PBCH is configured in a plurality of radio frames; and
a transmitting circuit, configured to operably transmit the radio frames;
wherein each of the radio frames comprises a plurality of subframes; each of the subframes comprises a plurality of slots; each of the slots comprises a plurality of orthogonal frequency division multiplexing (OFDM) symbols; each of the OFDM symbols comprises a plurality of subcarriers; each of the slots comprises a plurality of radio blocks (RBs); each of the RBs comprises a predetermined number of OFDM symbols located on a predetermined number of subcarriers; the mapping circuit maps the modulated MIBs to a plurality of central RBs of a first predetermined OFDM symbol of a first predetermined subframes of the radio frames, to a plurality of central RBs of a second predetermined OFDM symbol of the first predetermined subframes of the radio frames, to a plurality of central RBs of a third predetermined OFDM symbol of a second predetermined subframes of the radio frames and to a plurality of central RBs of a fourth predetermined OFDM symbol of the second predetermined subframes of the radio frames; the central RBs are configured to be around a DC subcarrier of the subcarriers; and the first predetermined OFDM symbol, the second predetermined OFDM symbol, the third predetermined OFDM symbol and the fourth predetermined OFDM symbol are respectively configured to be adjacent to a primary synchronization signal and a secondary synchronization signal.

8. The communication station of claim 7, wherein in a frequency division duplex system, the first predetermined subframe is configured as a first subframe of each of the radio frames and the second predetermined subframe is configured as a sixth subframe of each of the radio frames; the first predetermined OFDM symbol, the second predetermined OFDM symbol, the third predetermined OFDM symbol and the fourth predetermined OFDM symbol are respectively configured as a fifth OFDM symbol of the first predetermined subframe, an eighth OFDM symbol of the first predetermined subframe, a fifth OFDM symbol of the second predetermined subframe and an eighth OFDM symbol of the second predetermined subframe.

9. The communication station of claim 7, wherein in a time division duplex system, the first predetermined subframe is configured as a second subframe of each of the radio frames and the second predetermined subframe is configured as a seventh subframe of each of the radio frames; the first predetermined OFDM symbol, the second predetermined OFDM symbol, the third predetermined OFDM symbol and the fourth predetermined OFDM symbol are respectively configured as a first OFDM symbol of the first predetermined subframe, a second OFDM symbol of the first predetermined subframe, a first OFDM symbol of the second predetermined subframe and a second OFDM symbol of the second predetermined subframe.

10. A communication device, comprising:
a receiving circuit, configured to operably receive a plurality of radio frames transmitted by a first communication station;
a demapping circuit, configured to operably demap one or more modulated master information blocks (MIBs) transmitted by the first communication station in a new carrier type physical broadcast channel (PBCH); and
a demodulation circuit, configured to operably demodulate the one or more MIBs;
wherein each of the radio frames comprises a plurality of subframes; each of the subframes comprises a plurality of slots; each of the slots comprises a plurality of orthogonal frequency division multiplexing (OFDM) symbols; each of the OFDM symbols comprises a plurality of subcarriers; each of the slots comprises a plurality of radio blocks (RBs); each of the RBs comprises a predetermined number of OFDM symbols located on a predetermined number of subcarriers; the demapping circuit demaps the modulated MIBs from a plurality of central RBs of a first predetermined subframes of the radio frames; the central RBs are configured to be around a DC subcarrier of the subcarriers; and the demapping circuit demaps the modulated MIBs only from part of the central RBs;
wherein the modulated MIBs are configured to locate in a first RB and a second RB of the central RBs of a first slot of the first predetermined subframe and to a third RB and a fourth RB of the central RBs of a second slot of the second predetermined subframe; the first RB and the third RB respectively comprise a first RB number and a third RB number which are different and the second RB and the fourth RB respectively comprise a second RB number and a fourth RB number which are different.

11. The communication device of claim 10, wherein the modulated MIBs are configured to locate in a first RB and a second RB of the central RBs of a first slot of the first predetermined subframe and in a third RB and a fourth RB of the central RBs of a second slot of the first predetermined subframe; the first RB and the third RB comprise a same first RB number; and the second RB and the fourth RB comprise a same second RB number.

12. The communication device of claim 11, wherein the first RB and the second RB are separated by four RBs among the central RBs of the first slot; and the third RB and the fourth RB are separated by 4 RBs among the central RBs of the second slot.

13. The communication device of claim 11, wherein when a nearby second communication station transmits PBCH signals by utilizing a plurality of RBs with a third RB number and a plurality of RBs with a fourth RB number, the demapping circuit demaps the modulated MIBs from the first RB, the second RB, the third RB and the fourth RB; the first RB number is different from the third RB number and the fourth number; and the second RB number is different from the third RB number and the fourth RB number.

14. The communication device of claim 11, wherein the modulated MIBs are configured to locate in a fifth RB and a sixth RB of the central RBs of a first slot of the first predetermined subframe and in a seventh RB and an eighth RB of the central RBs of a second slot of the first predetermined subframe; the fifth RB and the seventh RB comprise a same third RB number; and the sixth RB and the eighth RB comprise a same fourth RB number.

15. The communication device of claim 11, wherein when a nearby second communication station transmits PBCH signals by utilizing a plurality of RBs with a fifth RB number, a plurality of RBs with a sixth RB number, a plurality of RBs with a seventh RB number and a plurality of RBs with an eighth RB number, the demapping circuit demaps the modulated MIBs to the first RB, the second RB, the third RB and the fourth RB; and each of the first RB number, the second RB number, the third RB number and the fourth RB number is different from at least three of the fifth RB number, the sixth RB number, and the seventh RB number and the eighth RB number.

16. A communication device, comprising:
a receiving circuit, configured to operably receive a plurality of radio frames transmitted by a first communication station;
a demapping circuit, configured to operably demap one or more modulated master information blocks (MIBs) transmitted by the first communication station in a new carrier type physical broadcast channel (PBCH); and
a demodulation circuit, configured to operably demodulate the one or more MIBs;
wherein each of the radio frames comprises a plurality of subframes; each of the subframes comprises a plurality of slots; each of the slots comprises a plurality of orthogonal frequency division multiplexing (OFDM) symbols; each of the OFDM symbols comprises a plurality of subcarriers; each of the slots comprises a plurality of radio blocks (RBs); each of the RBs comprises a predetermined number of OFDM symbols located on a predetermined number of subcarriers; the demapping circuit demaps the modulated MIBs from a plurality of central RBs of a first predetermined OFDM symbol of a first predetermined subframes of the radio frames, to a plurality of central RBs of a second predetermined OFDM symbol of the first predetermined subframes of the radio frames, to a plurality of central RBs of a third predetermined OFDM symbol of a second predetermined subframes of the radio frames and to a plurality of central RBs of a fourth predetermined OFDM symbol of the second predetermined subframes of the radio frames; the central RBs are configured to be around a DC subcarrier of the subcarriers; and the first predetermined OFDM symbol, the second predetermined OFDM symbol, the third predetermined OFDM symbol and the fourth predetermined OFDM symbol are respectively configured to be adjacent to a primary synchronization signal and a secondary synchronization signal.

17. The communication device of claim 16, wherein in a frequency division duplex system, the first predetermined subframe is configured as a first subframe of each of the radio frames and the second predetermined subframe is configured as a sixth subframe of each of the radio frames; the first predetermined OFDM symbol, the second predetermined OFDM symbol, the third predetermined OFDM symbol and the fourth predetermined OFDM symbol are respectively configured as a fifth OFDM symbol of the first predetermined subframe, an eighth OFDM symbol of the first predetermined subframe, a fifth OFDM symbol of the second predetermined subframe and an eighth OFDM symbol of the second predetermined subframe.

18. The communication device of claim 16, wherein in a time division duplex system, the first predetermined subframe is configured as a second subframe of each of the radio frames and the second predetermined subframe is configured as a seventh subframe of each of the radio frames; the first predetermined OFDM symbol, the second predetermined OFDM symbol, the third predetermined OFDM symbol and the fourth predetermined OFDM symbol are respectively configured as a first OFDM symbol of the first predetermined subframe, a second OFDM symbol of the first predetermined subframe, a first OFDM symbol of the second predetermined subframe and a second OFDM symbol of the second predetermined subframe.

* * * * *